United States Patent
Wang et al.

(10) Patent No.: US 12,248,466 B2
(45) Date of Patent: Mar. 11, 2025

(54) UNIVERSAL REPORTING USING NATURAL LANGUAGE QUERIES

(71) Applicant: Okta, Inc., San Francisco, CA (US)

(72) Inventors: Zhao Wang, Toronto (CA); Brian Huang, Toronto (CA); Murad Akhundov, Toronto (CA); Zhi Rui Du, Toronto (CA); Jad Siblini, Toronto (CA)

(*) Notice: Subject to any disclaimer, the term of this patent is extended or adjusted under 35 U.S.C. 154(b) by 0 days.

(21) Appl. No.: 18/361,476

(22) Filed: Jul. 28, 2023

(65) Prior Publication Data
US 2025/0036616 A1    Jan. 30, 2025

(51) Int. Cl.
*G06F 16/24*    (2019.01)
*G06F 16/2452*    (2019.01)

(52) U.S. Cl.
CPC .............................. *G06F 16/24522* (2019.01)

(58) Field of Classification Search
CPC ................................................ G06F 16/24522
See application file for complete search history.

(56) References Cited

U.S. PATENT DOCUMENTS

| | | | |
|---|---|---|---|
| 11,573,971 B1* | 2/2023 | Cannon | G06F 16/252 |
| 11,726,994 B1* | 8/2023 | Wang | G06F 16/243 |
| | | | 707/769 |
| 12,073,178 B2* | 8/2024 | Fatemi | G06F 40/56 |
| 2021/0026898 A1* | 1/2021 | Khillar | G06F 16/90332 |
| 2021/0064775 A1* | 3/2021 | Mishra | G06F 21/6227 |
| 2022/0245134 A1* | 8/2022 | Aalipour Hafshejani | |
| | | | G06F 16/243 |
| 2022/0311828 A1* | 9/2022 | Moir | G06F 40/166 |
| 2023/0096070 A1* | 3/2023 | Skiles | G06F 40/58 |
| | | | 707/706 |
| 2023/0315722 A1* | 10/2023 | Saxe | G06N 20/00 |
| | | | 726/1 |
| 2024/0061835 A1* | 2/2024 | Subramanian | G06F 16/252 |

* cited by examiner

*Primary Examiner* — Tarek Chbouki
(74) *Attorney, Agent, or Firm* — Holland & Hart LLP

(57) ABSTRACT

Methods, systems, and devices for managing report requests are described. A device associated with an identity management platform may receive a message from a user of an organization via a client device. The message may include a natural language and may indicate a request for information associated with the organization. In response to the request, the device may generate a first query based on translating the message into an intermediary language using a machine learning model. The intermediary language may be associated with the identity management platform. The device may transmit a report to the user via the client device. The report may be based on the first query and include the information associated with the organization.

20 Claims, 8 Drawing Sheets

UNIVERSAL REPORTING USING NATURAL LANGUAGE QUERIES

FIELD OF TECHNOLOGY

The present disclosure relates generally to identity and access management systems, and more specifically to universal reporting using natural language queries.

BACKGROUND

An organization may provide users of the organization with access to resources, such as software applications, that may be reviewed for security purposes, compliance, or license management, among other examples. Organizations that include several users must therefore manage several different access privileges. The necessity of managing identity and access privileges for several users may impose a considerable burden on the organizations.

In some cases, organizations may use tools, such as identity and access management tools, to help manage identity and access privileges for users of the organizations. For some use cases, however, conventional identity and access management tools may be deficient or sub-optimal in some current configurations.

SUMMARY

The described techniques relate to improved methods, systems, devices, and apparatuses that support universal reporting using natural language queries. For example, the described techniques provide a framework for dynamically generating reports based on natural language queries. In some examples, a device associated with an identity management platform may receive a message from a user of an organization via a client device. The message may include a natural language and may indicate a request for information associated with the organization. In response to the request, the device may generate a first query based on translating the message into an intermediary language using a machine learning model. The intermediary language may be associated with the identity management platform. The device may transmit a report to the user via the client device. The report may be based on the first query and include the information associated with the organization.

A method for managing report requests by a device associated with an identity management platform is described. The method may include receiving a message from a user of an organization via a client device, where the message includes a natural language and indicates a request for information associated with the organization, generating a first query based on translating the message into an intermediary language using a machine learning model, where the intermediary language is associated with the identity management platform, and transmitting a report to the user via the client device, where the report is based on the first query and includes the information associated with the organization.

A device for managing report requests is described. The device may include one or more memories storing processor executable code, and one or more processors coupled with the one or more memories. The one or more processors may individually or collectively operable to execute the code to cause the device to receive a message from a user of an organization via a client device, where the message includes a natural language and indicates a request for information associated with the organization, generate a first query based on translating the message into an intermediary language using a machine learning model, where the intermediary language is associated with the identity management platform, and transmit a report to the user via the client device, where the report is based on the first query and includes the information associated with the organization.

Another device for managing report requests is described. The device may include means for receiving a message from a user of an organization via a client device, where the message includes a natural language and indicates a request for information associated with the organization, means for generating a first query based on translating the message into an intermediary language using a machine learning model, where the intermediary language is associated with the identity management platform, and means for transmitting a report to the user via the client device, where the report is based on the first query and includes the information associated with the organization.

A non-transitory computer-readable medium storing code for managing report requests is described. The code may include instructions executable by a processor to receive a message from a user of an organization via a client device, where the message includes a natural language and indicates a request for information associated with the organization, generate a first query based on translating the message into an intermediary language using a machine learning model, where the intermediary language is associated with the identity management platform, and transmit a report to the user via the client device, where the report is based on the first query and includes the information associated with the organization.

In some examples of the method, device, and non-transitory computer-readable medium described herein, the intermediary language includes a first domain-specific language and the method, apparatuses, and non-transitory computer-readable medium may include further operations, features, means, or instructions for generating a second query based on translating the first query into a second domain-specific language using a compiler, where the second domain-specific language may be associated with a database including the information associated with the organization and generating the report based on executing the second query.

Some examples of the method, device, and non-transitory computer-readable medium described herein may further include operations, features, means, or instructions for transmitting the first query to the user of the organization via the client device, receiving a second message from the user of the organization via the client device, where the second message includes an indication of a modification to the first query, where translating the first query into the second domain-specific language includes, and translating the modification of the first query into the second domain-specific language.

In some examples of the method, device, and non-transitory computer-readable medium described herein, the second message includes the natural language and indicates the modification to the request for information associated with the organization, or the second message includes the modification of the first query.

Some examples of the method, device, and non-transitory computer-readable medium described herein may further include operations, features, means, or instructions for generating an intermediate representation of the first query and validating the intermediate representation based on a schema pre-defined by the database, where translating the first query into the second domain-specific language may be based on the validating.

Some examples of the method, device, and non-transitory computer-readable medium described herein may further include operations, features, means, or instructions for determining that the first query satisfies one or more constraints configured by the identity management platform, where translating the first query into the second domain-specific language may be based on the determining.

In some examples of the method, device, and non-transitory computer-readable medium described herein, determining that the first query satisfies the one or more constraints may include operations, features, means, or instructions for determining that the first query only requests information associated with the organization.

Some examples of the method, device, and non-transitory computer-readable medium described herein may further include operations, features, means, or instructions for training the machine learning model to translate the natural language into the intermediary language, where translating the message into the first query may be based on the training.

In some examples of the method, device, and non-transitory computer-readable medium described herein, the information associated with the organization may be based on data obtained by the identity management platform and training the machine learning model exposes the machine learning model to a structure of data.

In some examples of the method, device, and non-transitory computer-readable medium described herein, the machine learning model includes a large language model.

In some examples of the method, device, and non-transitory computer-readable medium described herein, the information associated with the organization includes information associated with resources of the organization that may be managed by the identity management platform, information associated with users of the resources, information associated with security events pertaining to the users, or information associated with security events pertaining to the resources, or any combination thereof.

DETAILED DESCRIPTION

Figure 1:
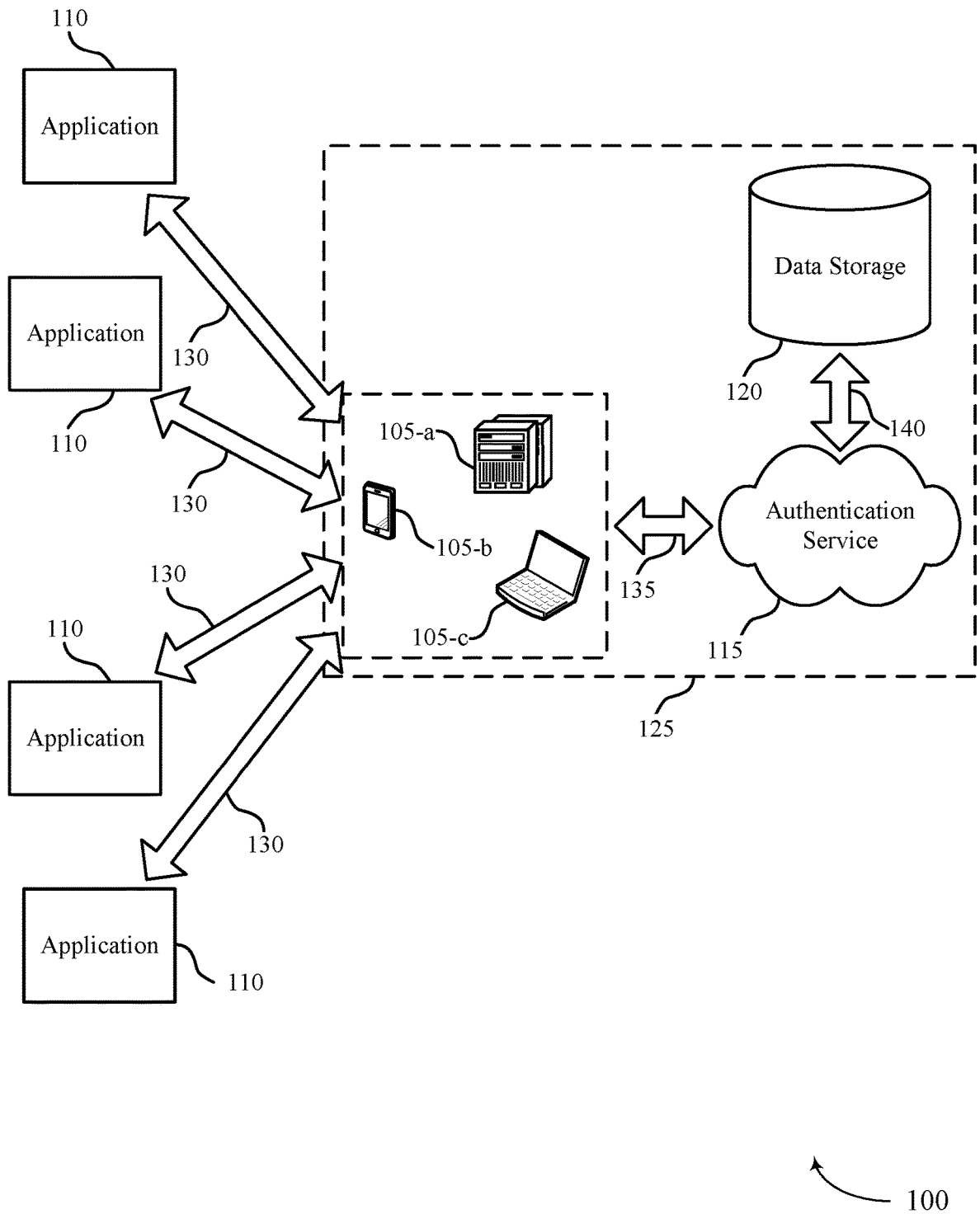
FIG. 1 illustrates an example of a system that supports universal reporting using natural language queries in accordance with aspects of the present disclosure.

Some organizations may use cloud computing to increase a performance of the organization. In such examples, however, use of cloud computing (e.g., applications accessed using cloud computing) may lead to security vulnerabilities. As such, some applications may include security features, such as constrained access to the applications or resources included in the applications, or both. For example, an application may request a user (e.g., an employee of an organization) to log into an account within the application using authentication information, such as a combination of a username and a password. The application may use the authentication information to verify an identity of the user. In some examples, however, an organization may use an increased quantity of applications and managing identity and access privileges for several users across several applications may impose a considerable burden on the organizations. That is, for an organization with an increased quantity of employees (e.g., users), managing authentication information across the multiple applications may impose a considerable burden. In some examples, an organization may employ software platforms to managing authentication information across multiple applications. Such software platforms may be referred to as identity management platforms and may provide the organizations with services across the multiple applications, such as services for single sign on (SSO), identity governance and administration (IGA), privileged access management (PAM), and identity access management (IAM), among other examples.

To increase security for an organization, and provide insights on user access to the organization, an identity management platform may collect information associated with the services provided for the organization. A user of the organization, such as an administrator, may access some information collected by the identity management platform by requesting a report. In some examples, however, the report may be configured (e.g., pre-configured) by the identity management platform and, as such, a type or quantity of information that may be obtained via the report may be fixed. In such examples, the type or quantity of information provided by the report may be insufficient or unsuitable for the user (or the organization), which may degrade a quality of insights attainable by the user for the organization.

Various aspects of the present disclosure generally relate to techniques for universal reporting using natural language queries and, more specifically, to a framework for dynamically generating reports based on natural language queries. For example, in accordance with such techniques, the user of the organization may generate customizable reports and obtain insights based on information (e.g., any information) collected by the identity management platform for the organization. In some examples, the user of the organization may transmit a natural language message (e.g., a question or statement in a natural language) to the identity management platform via a client device. The natural language message may indicate a request for information associate with the organization. For example, the natural language message may include a request for security information, such as information associated with log-in (or resource access) requests by users of the organization, or information associated with security events pertaining to the users (or the resources) of the organization, or both. In response to receiving the natural language message the software platform may use machine learning (e.g., generative artificial intelligence (AI)) to generate a query in an intermediary language (e.g., a first domain-specific language) from the natural language message.

The intermediary language may be associated with (e.g., specific to, developed by) the identity management platform and may enable the user of the organization (e.g., the administrator) and the identity management platform to inspect reporting queries prior to the reporting queries being executed (e.g., to obtain the information requested by the natural language message). For example, after the query in the intermediary language is validated by the user and the identity management platform, the identity management platform may translate the query from the intermediary language to another language, such as a second domain-specific language that may be associated with a database storing the requested information (e.g., on behalf of the identity management platform). In other words, the identity management platform may translate the query from the first domain-specific language that is associated with the identity management platform to the second domain-specific language that is associated with the database. The identity management platform may execute the query in the second domain-specific language to obtain the requested information from the database, and may report the obtained information to the user. In some examples, by translating the natural language query into the intermediary language prior to translating the query into the second domain-specific language associated with the database (and prior to executing the query), the identity management platform may generate reports based on the natural language messages while maintaining increased security for the organization.

Aspects of the disclosure are initially described in the context of a system for distributed computing. Aspects of the disclosure are also described in the context of block diagrams and a process flow. Aspects of the disclosure are further illustrated by and described with reference to apparatus diagrams, system diagrams, and flowcharts that relate to universal reporting using natural language queries.

FIG. 1 illustrates an example of a system 100 for distributed computing (e.g., cloud computing) that supports techniques for universal reporting using natural language queries in accordance with various aspects of the present disclosure. The system 100 includes client devices 105, applications 110, authentication service 115, and data storage 120. The authentication service 115 (e.g., an IDP) may be an example of a public or private cloud network. A client device 105 may access authentication service 115 over network connection 135. The network may implement transmission control protocol and internet protocol (TCP/IP), such as the Internet, or may implement other network protocols. A client device 105 may be an example of a user device, such as a server (e.g., client device 105-*a*), a smartphone (e.g., client device 105-*b*), or a laptop (e.g., client device 105-*c*). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other company type (e.g., organization type).

A client device 105 may interact with multiple applications 110 using one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication service 115 to store, manage, and process the data associated with the interactions 130. In some examples, the client device 105 may have an associated security or permission level. A client device 105 may have access to some applications, data, and database information within authentication service 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a computer cluster, or any other type of computing system, component, or environment. In some examples, the application 110 may be operated by a user or a group of users.

Authentication service 115 may offer cloud-based services to the client devices 105, the applications 110, or both. In some examples, the authentication service 115 may support a database system such as a multi-tenant database system. In such cases, authentication service 115 may serve multiple client devices 105 with a single instance of software. However, other types of systems may be implemented, including—but not limited to—client-server systems, mobile device systems, and mobile network systems. Authentication service 115 may receive data associated with interactions 130 from the client device 105 over network connection 135, and may store and analyze the data. In some examples, authentication service 115 may receive data directly from an interaction 130 between an application 110 and the client device 105. In some examples, the client device 105 may develop applications to run on authentication service 115. Authentication service 115 may be implemented using remote servers. In some examples, the remote servers may be examples of data storage 120.

Data storage 120 may include multiple servers. The multiple servers may be used for data storage, management, and processing. Data storage 120 may receive data from authentication service 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations.

Subsystem 125 (an identity and access management platform, a software platform that supports identity and access management) may include or be otherwise associated with client devices 105, authentication service 115, and data storage 120. In some examples, data processing may occur at any of the components of subsystem 125, or at a combination of these components. In some examples, servers may perform the data processing. The servers may be a client device 105 or located at data storage 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using APIs) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, one or more of the client devices 105 may be associated with an organization, and the subsystem 125 may be an example of an identity and access management platform (e.g., a software platform that supports identity and access management, an identity provider (IdP)) providing one or more services for the organization. For example, the subsystem 125 may provide services for users of the organization, such as administrators of the organization (e.g., a workforce of the organization), or end-users of the organization (e.g., customers of the organization), or both. In some examples, the subsystem 125 may store and manage digital identities of the users. For example, the organization may use the subsystem 125 to manage access to resources or services associated with the organization. In such examples, a user of the organization may use the subsystem 125 to manage identifying information associated with the user, such that the user may access the resources. For example, the subsystem 125 may manage log-in requests from the user, verify authenticators used for the log-in requests, and authorize access to resources associated with the request. In other words, the subsystem 125 may provide one or more identity (and access management) services to the organization, such as directories that store the users and attributes of the users, integrations for connecting software applications used by the organization (or by the users), workflows for automating identity management, authentication services (e.g., multi-factor authentication, SSO), security services (e.g., services for identifying malicious attacks), and data collection and reporting, among other examples. The subsystem 125 (e.g., a backend of the identity and access management platform) may include one or more other components not shown in the examiner of FIG. 1, such as an AI client, a compiler, and a reporting client, among other components. The AI client may support communication with an AI system, such as a generative AI system or one or more other types of systems that support foundational machine learning models. Additionally, or alternatively, the reporting client may support communications with a database (e.g., the data storage 120). The data storage 120 may be an example of a cloud computing system, a data-cloud, or both. In some examples, the data storage 120 may store information collected by the subsystem 125, such as information associated services provided to the organization by the subsystem 125.

In some examples, a user of the organization (e.g., an administrator) may use the client device 105-c (or another of the client devices 105) to access information collected by the subsystem 125 for the organization. For example, the administrator may access information to obtain insights into potential security risks and how end-users may consume resources and services associated with the organization. In some examples, the administrator may access the information via one or more reports pre-configured by the subsystem 125 (e.g., canned reports). In some examples, however, a type or quantity of information accessible via the pre-configured report may be fixed. For example, the pre-configured report may include a fixed type of information or a fixed quantity of information (e.g., a fixed quantity of columns, fields, or counts) that may be insufficient or unsuitable for the organization and, as such, may degrade a quality of insights attainable by the organization via the pre-configured report.

In some examples, the subsystem 125 may support one or more techniques for universal reporting using natural language queries, as described herein, to provide customizable reports for organizations. For example, the subsystem may support a framework for dynamically generating reports based on natural language queries. In some examples, such techniques may enable the user of the organization to generate (e.g., create) customizable reports and obtain insights (e.g., new insights) around information collected by the subsystem 125 for the organization (e.g., information associated with end-users that may be enrolled, factors that may be used by the enrolled users, a quantity of users that logged-in during a time period, a quantity of failed log-in attempts).

For example, the subsystem 125 may support a reporting query language (RQL) that the administrator of the organization may use to construct (e.g., describe, build) one or more reporting queries. RQL may be an example of a domain-specific language, such as structure query language (SQL) or another type of language that may support managing data stored in databases (e.g., relational database management systems). That is, RQL may be similar to SQL, such that a query generated in RQL may be used to obtain information in the form of a table or some other type of visualization (e.g., a bar graph, a chart). In other words, RQL may be used in accordance with a textual interface to build reports. RQL may be referred to herein as an intermediary language. The subsystem 125 may train the AI client (e.g., a reporting query assistant (RQA)) on RQL. That is, the AI client may be trained to understand RQL and to translate natural language into RQL. In other words, the subsystem 125 may train the AI client to construct RQL queries from natural language messages (e.g., natural language prompts, such as questions or statements input by the administrator in a natural language).

For example, the administrator may input (e.g., transmit via the client device 105-c) a natural language message (e.g., a statement or a question in a natural language, such as English, Mandarin, Spanish, Arabic, or Russian, among other examples) into the subsystem 125. The subsystem 125 may use the AI client to translate the natural language message into RQL as an RQL query. The subsystem 125 may output the RQL query to the administrator (e.g., via the client device 105-c). The administrator may inspect the RQL query, approve (or edit) the RQL query, and submit the RQL query to the subsystem 125 (e.g., to the backend system of the identity management platform). The subsystem 125 may process the RQL query (e.g., may translate the RQL query into SQL to be executed) and return a report (e.g., results) to the administrator in response to submission of the RQL query.

As an illustrative example, the administrator may input an English language statement that recites "give me all the users that logged in today" to the subsystem 125. In response, the subsystem 125 may use the AI client to generate an RQL translation of the input English language statement and an RQL query. The subsystem 125 may output the RQL query to the administrator (e.g., via the client device 105-c), and the administrator may approve or modify the output RQL query. In some examples, the administrator may modify the RQL translation by inputting another natural language message, modifying a previous natural language message, or modifying the RQL translation itself. The administrator may input (e.g., submit) the approved (or modified) RQL query to the subsystem 125. The subsystem 125 may, in response, generate a report based on the submitted RQL query and return the report to the administrator. For some examples in which the natural language message includes the English language statement that recites "give me all the users that logged in today," the report returned to the administrator may include information indicative of users (e.g., all users) of the organization that logged-in to the subsystem 125 (or resources of the organization managed by the subsystem 125) on the day the administrator submitted the English language statement to the subsystem 125. In some examples, the subsystem 125 may return the report via the user interface, for example, as a table or some other type of visualization. In some examples, the administrator may modify the visualization of the report, for example, via the user interface. In some examples, by generating the report based on the RQL query, the subsystem 125 may provide customizable reports based on natural language queries while maintaining (or improving) security for the organization.

It should be appreciated by a person skilled in the art that one or more aspects of the disclosure may be implemented in the system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
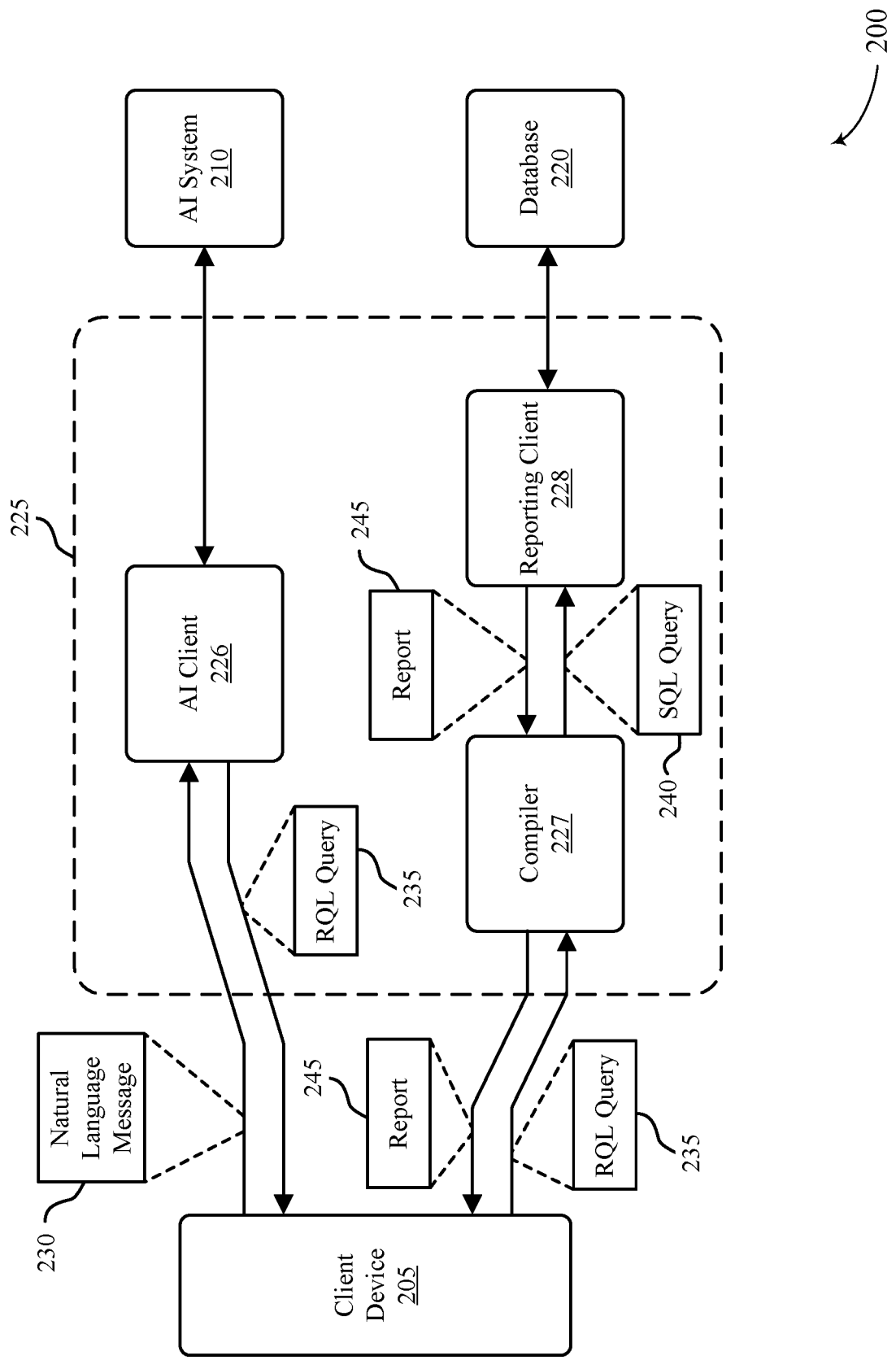
FIG. 2 shows an example of an architecture that supports universal reporting using natural language queries in accordance with aspects of the present disclosure.

FIG. 2 shows an example of an architecture 200 that supports universal reporting using natural language queries in accordance with aspects of the present disclosure. The architecture 200 includes a client devices 205, which may be an example of a client device illustrated by and described with reference to FIG. 1. For example, the client device 205 may be associated with an organization or a user of the organization, or both. The architecture 200 also includes a subsystem 225, which may be an example of a subsystem 125 illustrated by and described with reference to FIG. 1. For example, the subsystem 225 may be an example of an identity and access management platform (e.g., a software platform that supports identity and access management), which may also be referred to as an IdP. The subsystem 225 may provide one or more services for the organization. For example, the organization may use the subsystem 225 to manage identifying information associated with users of the organizations. In some examples, the subsystem 225 may provide services for users of the organization, such as a workforce (e.g., employees, contractors) of the organization or customers of the organization, or both. In some examples, the subsystem 225 may store and manages digital identities of users. For example, the organization may use the subsystem 225 to manage access to resources associated with the organization. In such examples, a user of the organization may use the subsystem 225 to manage identifying information associated with the user, such that the user may access the resources. For example, the subsystem 225 may manage log-in requests from the user, verify authenticators used for the log-in requests, and authorize access to resources associated with the request. In other words, the subsystem 225 may provide one or more identity (and access management) services to the organization, such as directories that store the users and attributes of the users, integrations for connecting software applications used by the organization (or by the users), workflows for automating identity management, authentication services (e.g., multi-factor authentication, SSO), security services (e.g., services for identifying malicious attacks), and data collection and reporting, among other examples. The subsystem 225 (e.g., the backend of the identity and access management platform) may include an AI client 226, a compiler 227, and a reporting client 228, among other components.

The AI client 226 may, in some examples, support communication with an AI system 210 (e.g., via an API or another communication interface). The AI system 210 may be an example of a generative AI system or one or more other types of systems that support foundational models (e.g., machine learning models that may be pre-trained on data), such as large language models (LLMs). For example, the AI system 210 may be an example of a machine learning model (e.g., any machine learning model or any system that may be supported by machine learning models) trained on words across multiple natural language tasks. Although the AI system 210 is illustrated in the example of FIG. 2 as being external to the subsystem 225, the AI system 210 may, in some implementations, be internal to the subsystem 225. For example, the AI system 210 may be part of (e.g., a component or subcomponent of) the AI client 226 or one or more other components of the subsystem 225.

The reporting client 228 may, in some examples, support communications with a database 220 (e.g., via an API or another communication interface). The database 220 may be an example of a data storage illustrated by and described with reference to FIG. 1. For example, the database 220 may be an example of a cloud computing system, a data-cloud, or both. In some examples, the database 220 may be an example of an integrated data management system that may support (e.g., include, store and provide access to) one or more data sources, one or more data stores, or a supporting data infrastructure. In the example of the architecture 200, the database 220 may provide storage for data (e.g., information) associated with the subsystem 225. For example, the database 220 may store information collected by the subsystem 225 for one or more organizations, such as information associated services provided to the organization by the subsystem 225. In some examples, the database 220) may store security information collect by the subsystem 225. Although the database 220 is illustrated in the example of FIG. 2 as being external to the subsystem 225, the database 220 may, in some implementations, be internal to the subsystem 225.

In some examples, a user of the organization (e.g., an administrator) may use the client device 205 (e.g., a user interface accessed by the administrator via the client device 205, which may be referred to as a dashboard) to access information collected by the subsystem 225 for the organization. For example, the administrator may access information to obtain insights into potential security risks or how end-users may consume resources and services associated with the organization (e.g., resources and services of the organization that are accessed or managed via the subsystem 225), or both. In some examples, the administrator may access the information via one or more reports. For example, the subsystem 225 may configure (e.g., preconfigure, pre-build) a set of reports that provide one or more types of information. As an illustrative example, a report of the set may provide information indicative of one or more users of the organization that attempted to log-in to the subsystem 225 (e.g., successfully logged-in or unsuccessfully logged-in), information indicative of a time or location of log-in attempts by the one or more users, resources accessed via the users, resources (e.g., applications) assigned to the one or more users, information indicative of authenticators (e.g., multi-factor authenticators) used by the one or more users to log-in to the subsystem 225, information indicative of a level of security associated with the authenticators, or information indicative of security events associated with the one or more users (or the organization), among other examples.

In some examples, the type or quantity of information accessible via one or more reports of the set may be fixed. For example, a report configured by the subsystem 225 (e.g., each report of the set) may include a fixed type of information or a fixed quantity of information (e.g., a fixed quantity of columns, fields, or counts). In some examples, however, different organizations may access (or wish to access) different types or quantities of information and the type or quantity of information provided by the report may be insufficient or unsuitable for one or more organizations. In other words, a configured report (e.g., a pre-configured or pre-built report) may provide insufficient or unsuitable information for one or multiple organizations served by the subsystem 225, which may degrade a quality of insights attainable via the configured report. In some examples, the organization may request a difference (e.g., new) or modified report. However, configuring a different reports or modifying a report (e.g., an existing report) may impose a considerable burden on the subsystem 225.

In some examples, one or more techniques for universal reporting using natural language queries, as described herein, may enable the administrator to obtain a customized report. For example, such techniques may provide a framework for dynamically generating reports based on natural language queries. In other words, such techniques may provide a framework for enabling users to create insights on data at a speed at which a user may generate a natural language query (i.e., at or approximately at the speed of thought). As such, the subsystem 225 may employ one or more techniques for universal reporting using natural language queries, as described herein, to provide customizable reports for one or more organizations, such as the organization associated with the client device 205. For example, such techniques may enable the administrator of the organization to generate (e.g., create) customizable reports and obtain insights (e.g., new insights) based on (e.g., around) information collected by the subsystem 225 for the organization (e.g., information associated with end-users that may be enrolled, factors that may be used by the enrolled users, a quantity of users that logged in during a time period, a quantity of failed log-in attempts).

In accordance with the framework for dynamically generating reports based on natural language queries, the subsystem 225 may support RQL. RQL may be associated with the subsystem 225 (e.g., the identity management platform). For example, the subsystem 225 may develop (or otherwise support) RQL as an intermediate language that administrators of organizations (e.g., such as the user of the client device 205) may use to construct (e.g., describe, build) one or more reporting queries. RQL may be an example of a domain-specific language, such as SQL or another type of language that may support managing data store in databases (e.g., relational database management systems). That is, RQL may be similar to SQL, such that RQL may be used to generate a query and obtain information in the form of a table or some other type of visualization (e.g., a bar graph, a chart). As such, RQL may be used to build reports, for example, in accordance with a textual interface. RQL may be referred to herein as an intermediary language. For example, the subsystem 225 may train the AI client 226 (e.g., an RQA) on RQL. That is, the subsystem 225 may train the AI client 226 to understand RQL and to translate natural language into RQL (e.g., using the AI system 210). In other words, the subsystem 225 may train the AI client 226 to construct RQL queries from natural language messages (e.g., natural language prompts, such as natural language questions or statements input by the administrator). As described herein, a natural language may include a language (e.g., any language) that developed naturally in a human community, for example, by a process of use, repetition, and change. In some examples, the subsystem 225 may train the AI client 226 or the AI system 210 (or both) on documentation (e.g., public documentation) indicative of information (e.g., data) that may be collected by the subsystem 225 (e.g., and that may be accessed via users). In other words, training the machine learning model may expose the AI client 226 (e.g., and the AI system 210) to a structure of data collected by the subsystem 225. In some examples, by exposing the AI client 226 (e.g., and the AI system 210) to the structure of the data, the subsystem 225 may refrain from exposing the AI client 226 (e.g., and the AI system 210) to data collected by the subsystem 225. That is, because the AI client 226 is trained to translate natural language into RQL, the AI client 226 (e.g., and the AI system 210) may not be exposed to data associated with organizations (e.g., customer data) served by the subsystem 225, such as personal identifiable information (PII) or other types of data that may be collected by the subsystem 225 for the organizations. In other words, by training the AI client 226 (and the AI system 210) to translate natural language into an intermediary language associated with the subsystem 225 (e.g., RQL), the subsystem may support AI generated queries that are verifiable by organizations (e.g., customers of the subsystem 225) and may reduce a likelihood of PII being sent to the AI system 210 (e.g., to model providers). Additionally, by training the AI client 226 (and the AI system 210) to translate natural language into an intermediary language associated with the subsystem 225, the subsystem 225 may reduce a likelihood of injection attacks (e.g., SQL injections), data hallucinations, or both. That is, because the AI client 226 is trained to translate natural language into RQL (e.g., to only translate natural language into RQL), the subsystem 225 may reduce a likelihood of injections in languages other than RQL (e.g., the AI client 226 may not support SQL injections). Additionally, because the AI client 226 (e.g., and the AI system 210) is trained using the structure of data obtained by the subsystem 225 (e.g., and not the data itself) a likelihood of the AI client hallucinating data is relatively low.

As illustrated in the example of FIG. 2, the administrator of the organization may transmit (e.g., input via a browser on the client device 205) a natural language message 230 to the subsystem 225. The natural language message may indicate a request for information associate with the organization. For example, the natural language message may include a request security information, such as a request for groups or authenticators, or both, that one or more users of the organization have access to. In response, the subsystem 225 may use the AI client 226 to translate the natural language message 230 into an RQL query 235. For example, the AI client 226 may transmit (e.g., input, send, forward) the natural language message 230 to the AI system 210. In response, the AI system 210 may return the RQL query 235. In other words, in response to receiving the natural language message 230, the subsystem 225 may generating the RQL query 235 based on translating the natural language message 230 into RQL (e.g., an intermediary language) using the AI system 210 (e.g., a machine learning model).

In some examples, the subsystem 225 may transmit the RQL query 235 to the administrator via the client device 205. For example, some AI models may hallucinate data (e.g., output data that is not real, does not match data the AI model has been trained on, or does not match another identifiable pattern). In such examples, enabling users to directly obtain data from AI models using natural languages (e.g., without using an intermediary language) may degrade a level of trust associated with the obtained data. Accordingly, the subsystem 225 may translate the natural language message 230 into the RQL query 235. Additionally, to increase a level of trust associated with data to be obtained via the natural language message, the subsystem 225 may output the RQL query 235 to the administrator via the client device 205 (e.g., may display the RQL query 235 via the user interface), such that the administrator may inspect and verify the RQL query 235. That is, the administrator may approve or modify (or both) the RQL query 235, for example, prior to the RQL query 235 being executed (e.g., by the subsystem 225). In some examples, enabling the administrator to inspect the RQL query 235 may increase security for the organization.

The administrator may transmit the RQL query 235 to the subsystem 225 (e.g., may click a button to send the generated or modified version of the generated RQL query back to the backend service of the subsystem 225). For example, the administrator may provide the RQL query 235 (e.g., a same RQL query as was generated via the AI client 226 or a modified version of the RQL query generated via the AI client 226) to a compiler 227 of the subsystem 225, which may be referred to as an RQL compiler. For example, the compiler 227 may generate an SQL query 240 based on translating the RQL query 235 into SQL (or another type of domain-specific language), which may be associated with the database 220 (e.g., a database that includes the information associated with the organization). That is, the compiler 227 may compile the RQL query 235 down into SQL, such that the RQL query 235 may be run to obtain results (from the database 220) to be returned to the administrator. In other words, the compiler 227 may translate the RQL query 235 (e.g., a query in the intermediary language) into an SQL language to obtain the SQL query 240.

In some examples, the compiler 227 (or another component of the subsystem 225) may include a schema validator, which the subsystem 225 may use to validate the RQL query 235. For example, in addition to translating the RQL query 235 into SQL, the compiler 227 may also translate the RQL query 235 into an into intermediate representation (e.g., the data structure or code used internally by the compiler 227 to represent source code). In some examples, the compiler 227 may use the intermediate representation to further process the RQL query 235 (e.g., to improve or validate the RQL query 235, to translate the RQL query 235 into SQL). For example, the schema validator may validate the internal representation against a schema of the database 220 (e.g., a pre-defined schema). That is, the compiler 227 (e.g., via the schema validator) may use the intermediary representation of the RQL query 235 to determine whether the RQL query 235 is valid against the schema of the database, or to determine whether operations that may be performed in response to executing the RQL query 235 are valid (e.g., and are not malicious). In other words, the compiler 227 may validate the intermediate representation (e.g., and therefore the RQL query 235) based on a schema pre-defined by the database 220 (or pre-defined by the subsystem 225 for the database 220).

In some examples, validation of the RQL query 235 (e.g., the intermediate representation of the RQL query 235) may fail. In such an example, the RQL query may be terminated (e.g., may not be translated into SQL). As an illustrative example, the RQL query 235 may indicate a request for the subsystem 225 to query a table in the database 220. In such an example, the compiler 227 may determine whether the table exists prior to translating the RQL query 235 into SQL (e.g., prior to generating the SQL query 240 from the RQL query 235) or prior to executing the SQL query 240. Additionally, or alternatively, the compiler 227 may determine whether the RQL query 235 (e.g., the intermediate representation of the RQL query 235) satisfies one or more constraints configured by the subsystem 225 (or configured by the administrator of the organization). In other words, the subsystem 225 may use the compiler 227 to enforce data constraints (e.g., requirements). As an illustrative example, the RQL query 235 may indicate a request for the subsystem 225 to query data from one or more other organizations (e.g., one or more organizations different from the organization associated with the user of the client device 205) or may request to query sensitive data (e.g., data that the user of the client device 205 may not have access to). In such an example, the RQL query may be terminated (e.g., may not be translated into SQL, may not be executed). That is, the compiler 227 may determine whether the RQL query 235 requests (e.g., only request) information associated with the organization prior to translating the RQL query 235 into SQL (e.g., prior to generating the SQL query 240 from the RQL query 235) or prior to executing the SQL query 240. In such examples, by validating the RQL query 235, the subsystem 225 may reduce a likelihood (e.g., may prevent) of the reporting client 228 executing malicious queries.

The compiler 227 may transmit the SQL query 240 to the reporting client 228. The reporting client 228 may generate a report 245 based on executing the SQL query 240. In other words, the reporting client 228 may execute (e.g., run) the SQL query 240 to obtain the information associated with the organization (e.g., from the database 220). The subsystem 225 may generate the report 245 based on the obtained information and transmit the report 245 to the administrator via the client device 205. The report 245 may be based on the RQL query 235 and, as such, may include the information requested by the natural language message. In some examples, the report 245 may include information associated with services provided to the organization by the subsystem 225. For example, based on the natural language message, the report 245 may include information associated with resources of the organization that are managed by the subsystem 225, information associated with users of the resources (e.g., end-users), information associated with security events pertaining to the users, or information associated with security events pertaining to the resources, or any combination thereof. In some examples, by using RQL, the subsystem 225 may reduce a likelihood of injection attacks while maintaining capabilities for validate (e.g., statically validate) natural language queries, among other benefits.

Figure 3:
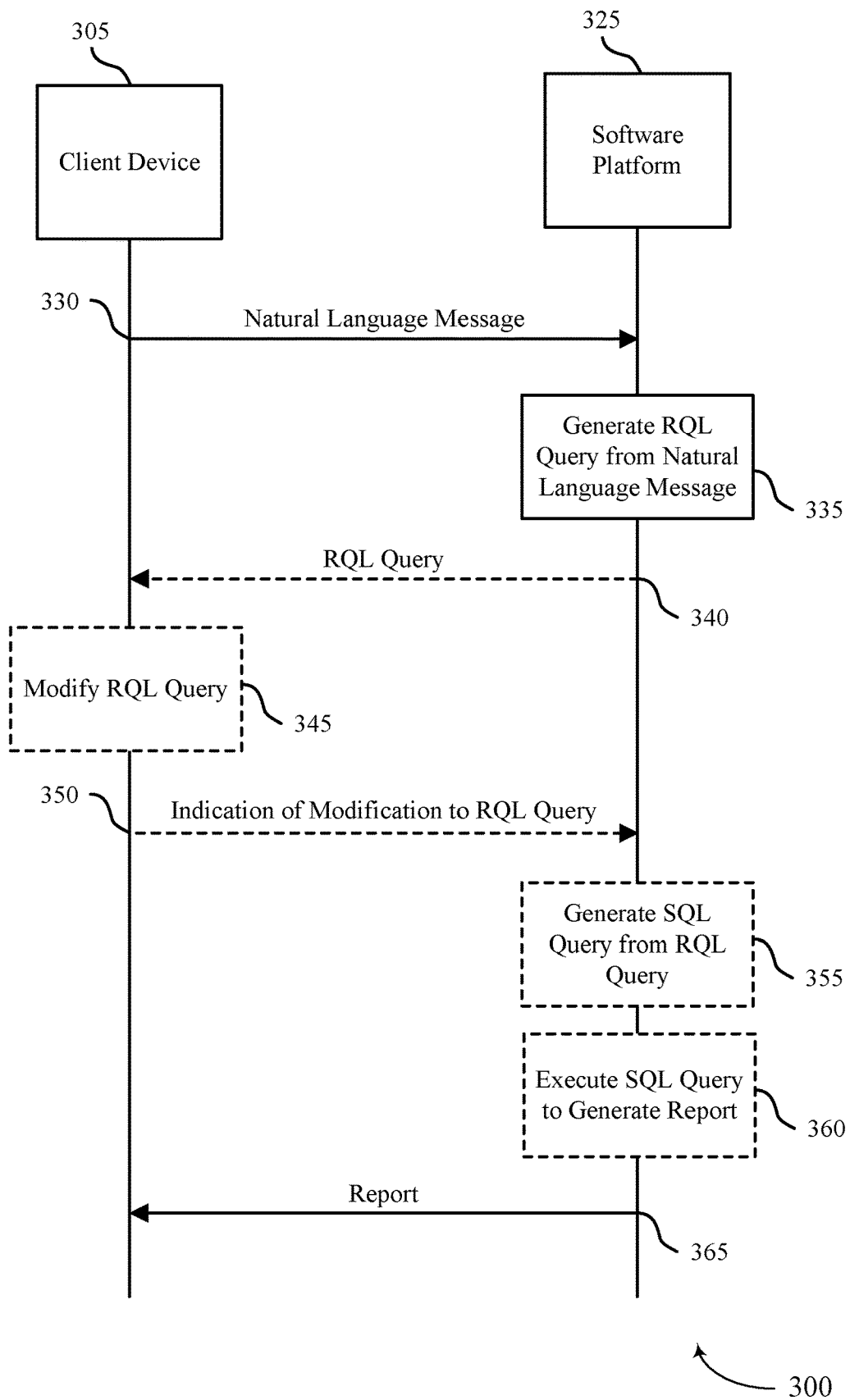
FIG. 3 shows an example of a process flow that supports universal reporting using natural language queries in accordance with aspects of the present disclosure.

FIG. 3 shows an example of a process flow 300 that supports universal reporting using natural language queries in accordance with aspects of the present disclosure. The process flow 300 may implement or be implemented by aspects of the system 100 and the architecture 200. For example, one or more aspects of the process flow 300 may be implemented by a client device 305, which may be an example of a client device illustrated by and described with reference to FIGS. 1 and 2. For example, the client device 305 may be used by a user (e.g., an administrator) of an organization. Additionally, one or more aspects of the process flow 300 may be implemented at a software platform 325, which may be an example of a subsystem illustrated by and described with reference to FIGS. 1 and 2. For example, the software platform 325 (e.g., an identity and access management platform) may be associated with (e.g., provide services for) the organization. In the following description of the process flow 300, the information communicated between the client device 305 and the software platform 325 may be performed in different orders or at different times than shown. Additionally, or alternatively, some operations may be omitted from the process flow 300 and other operations may be added to the process flow 300. In some examples, two or more operations may be combined in the process flow 300. The process flow 300 may provide for improved reporting, among other benefits.

At 330, the software platform 325 may receive a natural language message from the administrator of the organization via the client device 305. The natural language message may be an example of a natural langue message illustrated by and described with reference to FIG. 2. For example, the natural language message indicate a request for information associated with the organization.

At 335, the software platform 325 may generate an RQL query from the natural language message. The RQL query may be an example of an RQL query illustrated by and described with reference to FIG. 2. For example, the software platform 325 may generate the RQL query based on translating the natural language message into an intermediary language associated with the software platform 325 (e.g., into RQL). The software platform 325 may translate the natural language message into RQL using a machine learning model, which may be an example of a machine learning model described with reference to FIG. 2. For example, the machine learning model may be an example of an AI system, an AI client, a model supported by the AI system, or a model supported by the AI client, or any combination thereof. The machine learning model may include (e.g., be an example of) a large language model.

In some examples, at 340, the software platform 325 may transmit the RQL query to the administrator of the organization via the client device. For example, the software platform may display the RQL query via a user interface access by the administrator via the client device 305.

In some examples, at 345, the administrator may modify the RQL query via the client device 305. The administrator may modify the RQL query indirectly, for example, by transmitting another natural language message or by modifying a previous natural language message (e.g., the natural language message transmitted at 330)). Additionally, or alternatively, the administrator may directly modify the RQL query (e.g., the RQL code of the RQL query), for example, via the user interface (e.g., a textural interface). In other words, the RQL query may be modified by input of a message in natural language or by a modification by the administrator. In some examples, the administrator may modify the RQL query to correct for inaccuracies or other deficiencies. For example, the administrator may determine (e.g., based on inspection of the RQL query) that the natural language message led to an output of incorrect intermediary language (e.g., incorrect RQL). In such an example, the administrator may modify the RQL (e.g., the RQL code) to correct or otherwise improve the RQL query. In some examples, the administrator may modify the RQL query prior to transmitting (e.g., sending, submitting, executing) the RQL query to the software platform 325. In other words, the administrator may modify the RQL query before executing against the software platform 325 (e.g., the identity management platform), which may also inspect (e.g., check) the RQL query to determine whether one or more constraints are satisfied (e.g., before translating the RQL query to SQL at 355, before executing the SQL query at 360, or before returning data to the user at 365).

In some examples, inspection of the RQL query at the software platform 325 may provide increased security for the organization. For example, a malicious user may input a malicious natural language message to obtain a malicious RQL query from the software platform 325. In such an example, the software platform 325 may inspect the malicious RQL query and determine that the malicious RQL query violates one or more constraints configured by the software platform 325 (e.g., the identity management platform). Additionally, in such an example, the software platform 325 may refrain from executing the malicious RQL query (or a malicious SQL query generated from the malicious RQL query) on behalf of the malicious user (e.g., in response to a request from the malicious user). In some examples, by imposing constraints on the RQL query the software platform 325 may reduce a likelihood of a natural language message causing the software platform 325 to return sensitive data (e.g., data with constraint violations) to one or more users, such as information that is not associated with one or more organizations of the one or more users (e.g., information outside of the one or more organizations) or information that violates regulatory rules (e.g., rules that may be based on an access level associated with the one or more users), among other examples.

In some examples, at 350, the software platform 325 may receive an indication of a modification to the RQL query from the administrator via the client device 305. In such an example, the software platform 325 may generate an SQL query (e.g., at 355) based on the modification to the RQL query. The indication may include the natural language (e.g., may be another natural language message or a modified version of a previous natural language message) or the indication may include the modification of the RQL query itself (e.g., a modified version of the RQL query).

In some examples, at 355, the software platform 325 may generate the SQL query from the RQL query (or the modified version of the RQL query). The SQL query may be an example of an SQL query illustrated by and described with reference to FIG. 2. For example, the software platform 325 may generate the SQL query based on translating the RQL query into SQL (or another type of domain-specific language that may be associated with a database that includes the information requested by the natural language message).

In some examples, at 360, the software platform 325 may execute the SQL query to generate a report. In other words, the software platform 325 may generate the report based on executing the SQL query. For example, the software platform 325 may execute the SQL query to obtain the information requested by the RQL query (e.g., and also requested by the natural language message) from the database. As such, the report, which includes the information, may be based on the RQL query (or the modified version of the RQL query).

At 365, the software platform may transmit the report to the administrator via the client device 305. The report may be an example of a report illustrated by and described with reference to FIG. 2. For example, the report may be on the RQL query and include the information associated with the organization. In some examples, by generating the report based on the RQL query (e.g., based on the intermediary language associated with the software platform 325), the software platform 325 may reduce a likelihood of attacks and injections from malicious users (e.g., malicious clients).

Figure 4:
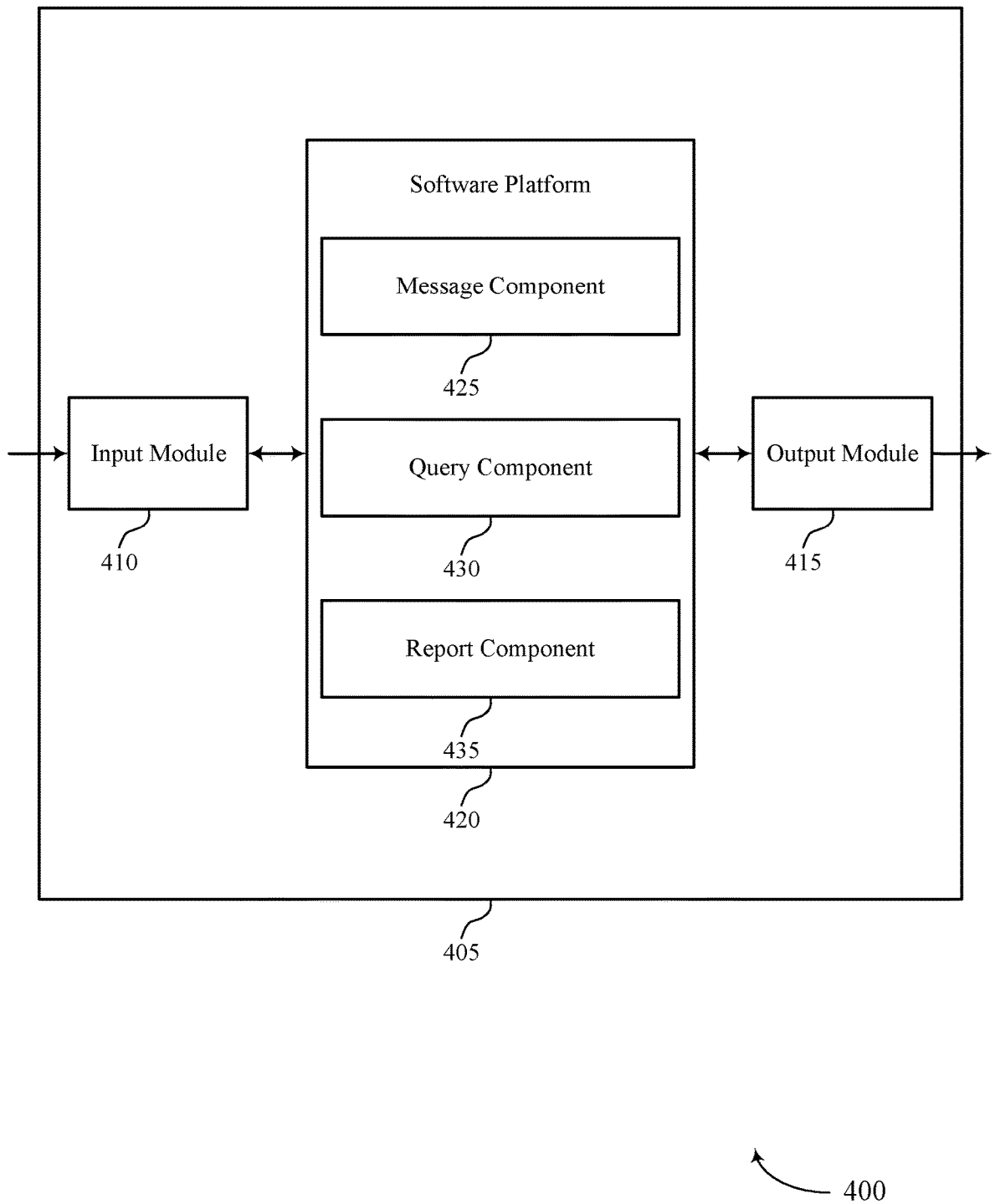
FIG. 4 shows a block diagram of an apparatus that supports universal reporting using natural language queries in accordance with aspects of the present disclosure.

FIG. 4 shows a block diagram 400 of a device 405 that supports universal reporting using natural language queries in accordance with aspects of the present disclosure. The device 405 may include an input module 410, an output module 415, and a software platform 420. The device 405, or one or more components of the device 405 (e.g., the input module 410, the output module 415, and the software platform 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the software platform 420 to support universal reporting using natural language queries. In some cases, the input module 410 may be a component of an I/O controller 610 as described with reference to FIG. 6.

The output module 415 may manage output signals for the device 405. For example, the output module 415 may receive signals from other components of the device 405, such as the software platform 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the software platform 420 may include a message component 425, a query component 430, a report component 435, or any combination thereof. In some examples, the software platform 420, or various components thereof, may be configured to perform various operations (e.g., receiving, monitoring, transmitting) using or otherwise in cooperation with the input module 410, the output module 415, or both. For example, the software platform 420 may receive information from the input module 410, send information to the output module 415, or be integrated in combination with the input module 410, the output module 415, or both to receive information, transmit information, or perform various other operations as described herein.

The software platform 420 may support managing report requests in accordance with examples as disclosed herein. The message component 425 may be configured to support receiving a message from a user of an organization via a client device, where the message includes a natural language and indicates a request for information associated with the organization. The query component 430 may be configured to support generating a first query based on translating the message into an intermediary language using a machine learning model, where the intermediary language is associated with the identity management platform. The report component 435 may be configured to support transmitting a report to the user via the client device, where the report is based on the first query and includes the information associated with the organization.

Figure 5:
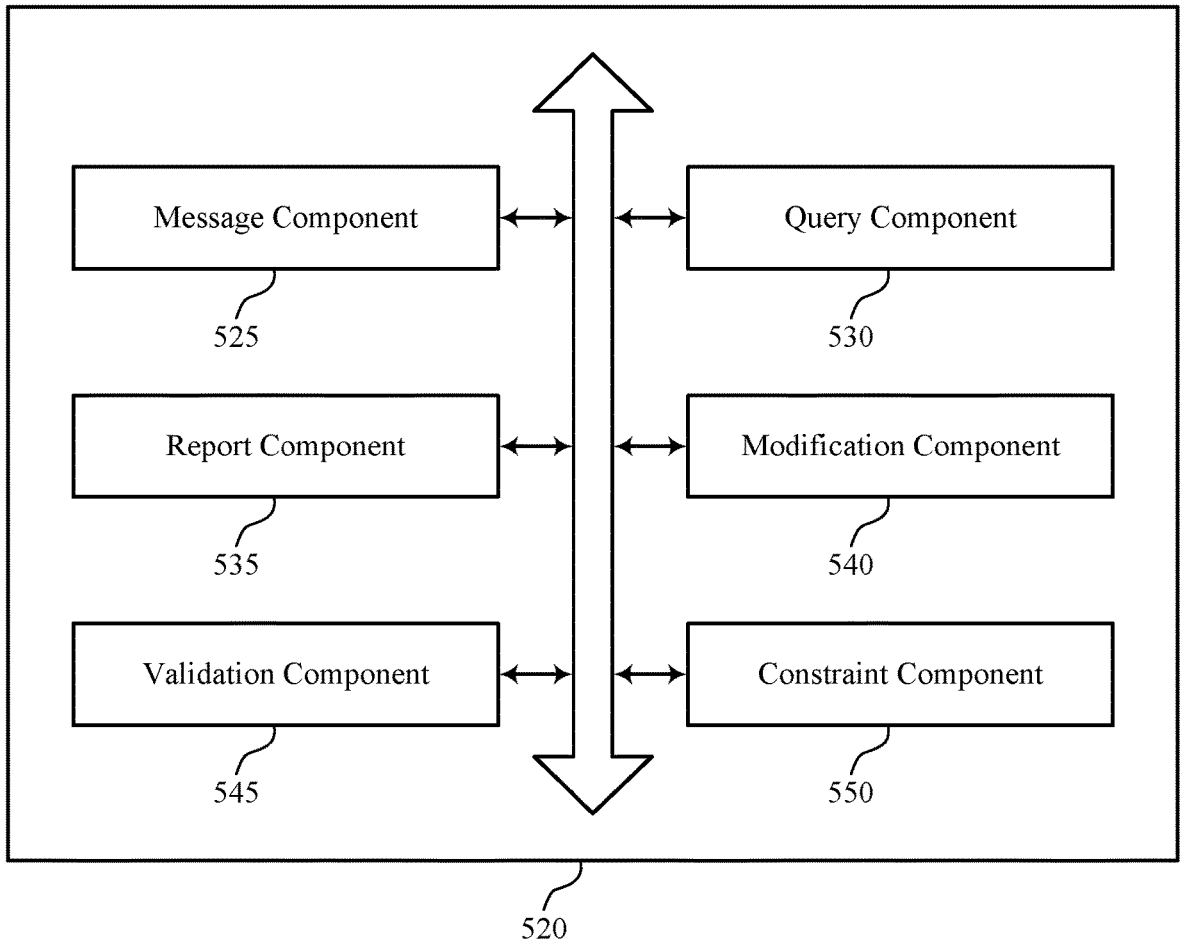
FIG. 5 shows a block diagram of a software platform that supports universal reporting using natural language queries in accordance with aspects of the present disclosure.

FIG. 5 shows a block diagram 500 of a software platform 520 that supports universal reporting using natural language queries in accordance with aspects of the present disclosure. The software platform 520 may be an example of aspects of a software platform or a software platform 420, or both, as described herein. The software platform 520, or various components thereof, may be an example of means for performing various aspects of universal reporting using natural language queries as described herein. For example, the software platform 520 may include a message component 525, a query component 530, a report component 535, a modification component 540, a validation component 545, a constraint component 550, or any combination thereof. Each of these components, or components of subcomponents thereof (e.g., one or more processors, one or more memories), may communicate, directly or indirectly, with one another (e.g., via one or more buses).

The software platform 520 may support managing report requests in accordance with examples as disclosed herein. The message component 525 may be configured to support receiving a message from a user of an organization via a client device, where the message includes a natural language and indicates a request for information associated with the organization. The query component 530 may be configured to support generating a first query based on translating the message into an intermediary language using a machine learning model, where the intermediary language is associated with the identity management platform. The report component 535 may be configured to support transmitting a report to the user via the client device, where the report is based on the first query and includes the information associated with the organization.

In some examples, the intermediary language includes a first domain-specific language, and the query component 530 may be configured to support generating a second query based on translating the first query into a second domain-specific language using a compiler, where the second domain-specific language is associated with a database including the information associated with the organization. In some examples, the intermediary language includes a first domain-specific language, and the report component 535 may be configured to support generating the report based on executing the second query.

In some examples, the query component 530 may be configured to support transmitting the first query to the user of the organization via the client device. In some examples, the modification component 540 may be configured to support receiving a second message from the user of the organization via the client device, where the second message includes an indication of a modification to the first query, and where translating the first query into the second domain-specific language includes translating the modification of the first query into the second domain-specific language.

In some examples, the second message includes the natural language and indicates the modification to the request for information associated with the organization, or the second message includes the modification of the first query.

In some examples, the query component 530 may be configured to support generating an intermediate representation of the first query. In some examples, the validation component 545 may be configured to support validating the intermediate representation based on a schema pre-defined by the database, where translating the first query into the second domain-specific language is based on the validating.

In some examples, the constraint component 550 may be configured to support determining that the first query satisfies one or more constraints configured by the identity management platform, where translating the first query into the second domain-specific language is based on the determining.

In some examples, to support determining that the first query satisfies the one or more constraints, the constraint component 550 may be configured to support determining that the first query only requests information associated with the organization.

In some examples, the query component 530 may be configured to support training the machine learning model to translate the natural language into the intermediary language, where translating the message into the first query is based on the training.

In some examples, the information associated with the organization is based on data obtained by the identity management platform. In some examples, training the machine learning model exposes the machine learning model to a structure of data. In some examples, the machine learning model includes a large language model.

In some examples, the information associated with the organization includes information associated with resources of the organization that are managed by the identity management platform, information associated with users of the resources, information associated with security events pertaining to the users, or information associated with security events pertaining to the resources, or any combination thereof.

Figure 6:
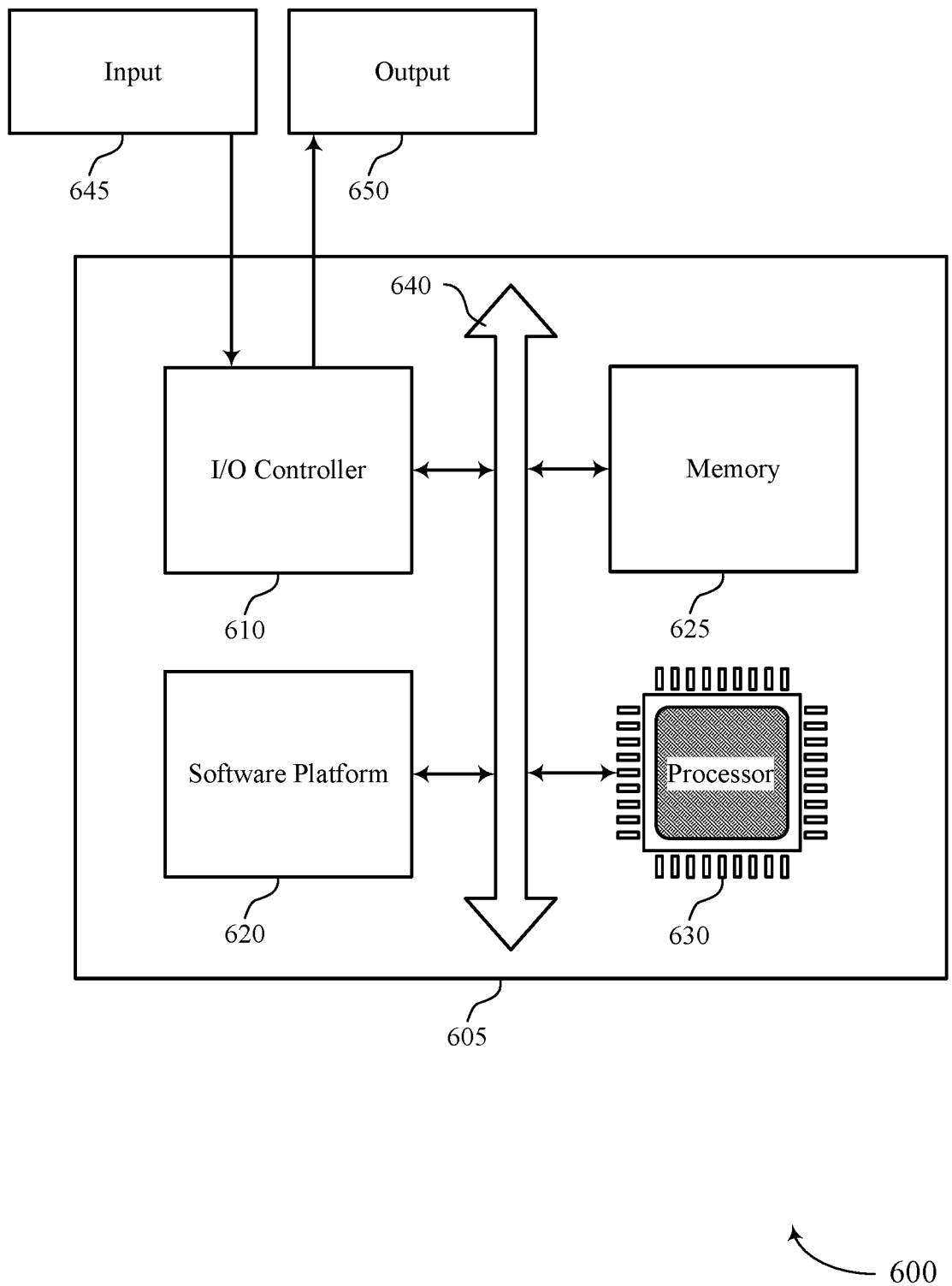
FIG. 6 shows a diagram of a system including a device that supports universal reporting using natural language queries in accordance with aspects of the present disclosure.

FIG. 6 shows a diagram of a system 600 including a device 605 that supports universal reporting using natural language queries in accordance with aspects of the present disclosure. The device 605 may be an example of or include the components of a device 405 as described herein. The device 605 may include components for bi-directional data communications including components for transmitting and receiving communications, such as a software platform 620, an I/O controller 610, at least one memory 625, and at least one processor 630. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

Memory 625 may include random-access memory (RAM) and ROM. The memory 625 may store computer-readable, computer-executable software including instructions that, when executed, cause at least one processor 630 to perform various functions described herein. In some cases, the memory 625 may contain, among other things, a BIOS which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting universal reporting using natural language queries). The processor 630 may be an example of a single processor or multiple processors. For example, the device 605 may include one or more processors 630.

The software platform 620 may support managing report requests in accordance with examples as disclosed herein. For example, the software platform 620 may be configured to support receiving a message from a user of an organization via a client device, where the message includes a natural language and indicates a request for information associated with the organization. The software platform 620 may be configured to support generating a first query based on translating the message into an intermediary language using a machine learning model, where the intermediary language is associated with the identity management platform. The software platform 620 may be configured to support transmitting a report to the user via the client device, where the report is based on the first query and includes the information associated with the organization.

By including or configuring the software platform 620 in accordance with examples as described herein, the device 605 may support techniques for improved communication reliability, improved user experience, and improved coordination between devices.

Figure 7:
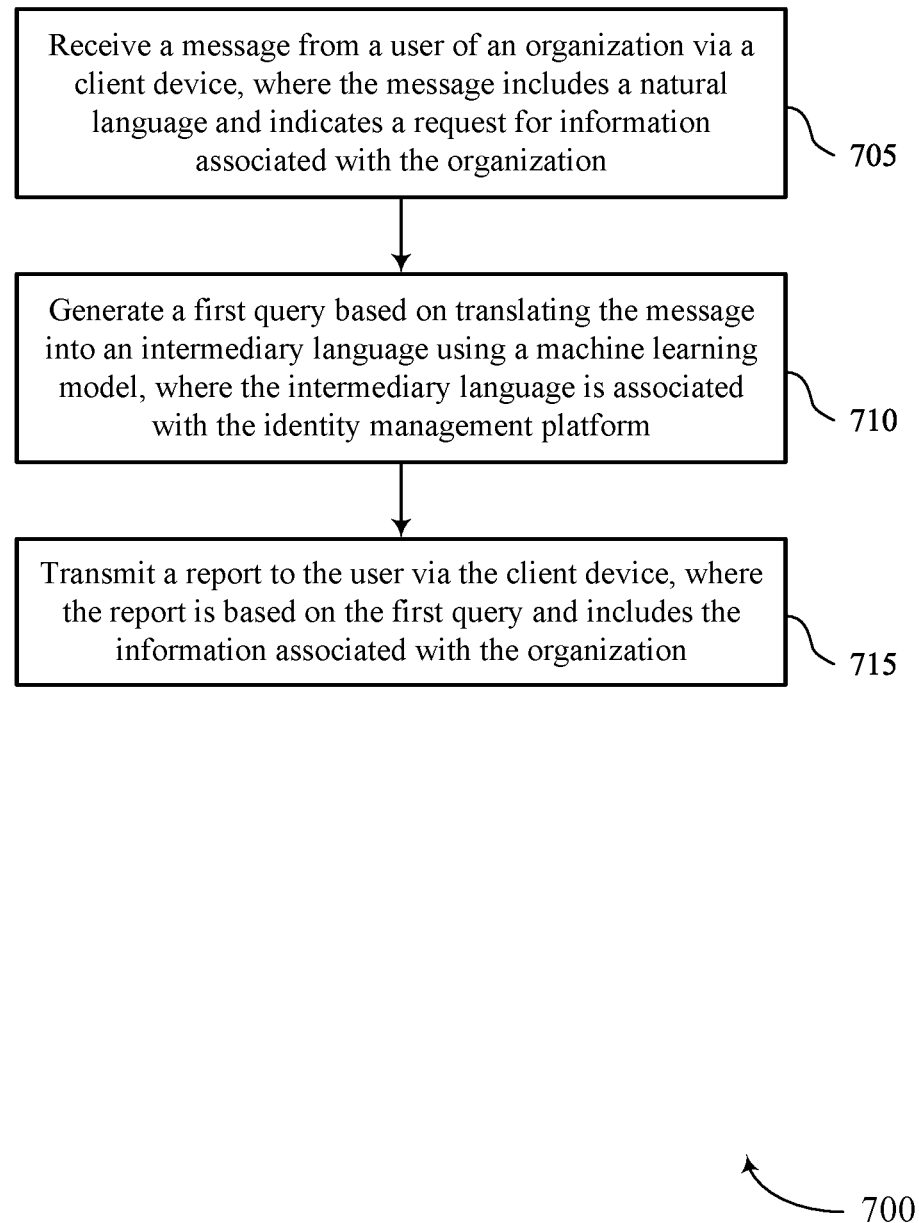
FIGS. 7 and 8 show flowcharts illustrating methods that support universal reporting using natural language queries in accordance with aspects of the present disclosure.

FIG. 7 shows a flowchart illustrating a method 700 that supports universal reporting using natural language queries in accordance with aspects of the present disclosure. The operations of the method 700 may be implemented by a device or its components as described herein. For example, the operations of the method 700 may be performed by a device as described with reference to FIGS. 1 through 6. In some examples, a device may execute a set of instructions to control the functional elements of the device to perform the described functions. Additionally, or alternatively, the device may perform aspects of the described functions using special-purpose hardware.

At 705, the method may include receiving a message from a user of an organization via a client device, where the message includes a natural language and indicates a request for information associated with the organization. The operations of block 705 may be performed in accordance with examples as disclosed herein. In some examples, aspects of the operations of 705 may be performed by a message component 525 as described with reference to FIG. 5.

At 710, the method may include generating a first query based on translating the message into an intermediary language using a machine learning model, where the intermediary language is associated with the identity management platform. The operations of block 710 may be performed in accordance with examples as disclosed herein. In some examples, aspects of the operations of 710 may be performed by a query component 530 as described with reference to FIG. 5.

At 715, the method may include transmitting a report to the user via the client device, where the report is based on the first query and includes the information associated with the organization. The operations of block 715 may be performed in accordance with examples as disclosed herein. In some examples, aspects of the operations of 715 may be performed by a report component 535 as described with reference to FIG. 5.

Figure 8:
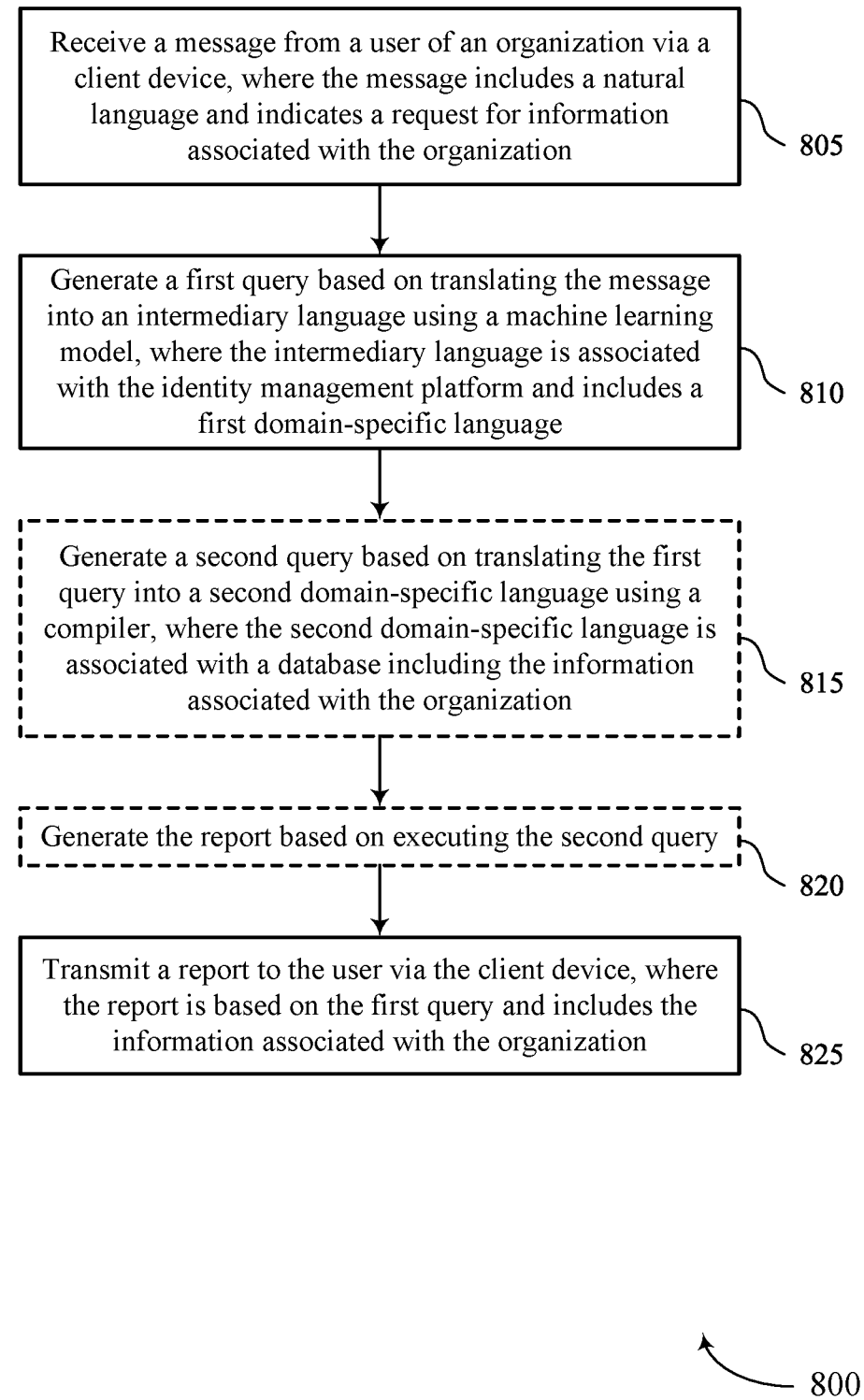

FIG. 8 shows a flowchart illustrating a method 800 that supports universal reporting using natural language queries in accordance with aspects of the present disclosure. The operations of the method 800 may be implemented by a device or its components as described herein. For example, the operations of the method 800 may be performed by a device as described with reference to FIGS. 1 through 6. In some examples, a device may execute a set of instructions to control the functional elements of the device to perform the described functions. Additionally, or alternatively, the device may perform aspects of the described functions using special-purpose hardware.

At 805, the method may include receiving a message from a user of an organization via a client device, where the message includes a natural language and indicates a request for information associated with the organization. The operations of block 805 may be performed in accordance with examples as disclosed herein. In some examples, aspects of the operations of 805 may be performed by a message component 525 as described with reference to FIG. 5.

At 810, the method may include generating a first query based on translating the message into an intermediary language using a machine learning model, where the intermediary language is associated with the identity management platform and includes a first domain-specific language. The operations of block 810 may be performed in accordance with examples as disclosed herein. In some examples, aspects of the operations of 810 may be performed by a query component 530 as described with reference to FIG. 5.

At 815, the method may include generating a second query based on translating the first query into a second domain-specific language using a compiler, where the second domain-specific language is associated with a database including the information associated with the organization. The operations of block 815 may be performed in accordance with examples as disclosed herein. In some examples, aspects of the operations of 815 may be performed by a query component 530 as described with reference to FIG. 5.

At 820, the method may include generating the report based on executing the second query. The operations of block 820 may be performed in accordance with examples as disclosed herein. In some examples, aspects of the operations of 820 may be performed by a report component 535 as described with reference to FIG. 5.

At 825, the method may include transmitting a report to the user via the client device, where the report is based on the first query and includes the information associated with the organization. The operations of block 825 may be performed in accordance with examples as disclosed herein. In some examples, aspects of the operations of 825 may be performed by a report component 535 as described with reference to FIG. 5.

The following provides an overview of aspects of the present disclosure:

Aspect 1: A method for managing report requests at a device associated with an identity management platform, comprising: receiving a message from a user of an organization via a client device, wherein the message comprises a natural language and indicates a request for information associated with the organization; generating a first query based at least in part on translating the message into an intermediary language using a machine learning model, wherein the intermediary language is associated with the identity management platform; and transmitting a report to the user via the client device, wherein the report is based at least in part on the first query and comprises the information associated with the organization.

Aspect 2: The method of aspect 1, wherein the intermediary language comprises a first domain-specific language, the method further comprising: generating a second query based at least in part on translating the first query into a second domain-specific language using a compiler, wherein the second domain-specific language is associated with a database comprising the information associated with the organization; and generating the report based at least in part on executing the second query.

Aspect 3: The method of aspect 2, further comprising: transmitting the first query to the user of the organization via the client device; and receiving a second message from the user of the organization via the client device, wherein the second message comprises an indication of a modification to the first query, wherein translating the first query into the second domain-specific language comprises: translating the modification of the first query into the second domain-specific language.

Aspect 4: The method of aspect 3, wherein the second message comprises the natural language and indicates the modification to the request for information associated with the organization, or the second message comprises the modification of the first query.

Aspect 5: The method of any of aspects 2 through 4, further comprising: generating an intermediate representation of the first query; and validating the intermediate representation based at least in part on a schema pre-defined by the database, wherein translating the first query into the second domain-specific language is based at least in part on the validating.

Aspect 6: The method of any of aspects 2 through 5, further comprising: determining that the first query satisfies one or more constraints configured by the identity management platform, wherein translating the first query into the second domain-specific language is based at least in part on the determining.

Aspect 7: The method of aspect 6, wherein determining that the first query satisfies the one or more constraints comprises: determining that the first query only requests information associated with the organization.

Aspect 8: The method of any of aspects 1 through 7, further comprising: training the machine learning model to translate the natural language into the intermediary language, wherein translating the message into the first query is based at least in part on the training.

Aspect 9: The method of aspect 8, wherein the information associated with the organization is based at least in part on data obtained by the identity management platform, and training the machine learning model exposes the machine learning model to a structure of data.

Aspect 10: The method of any of aspects 1 through 9, wherein the machine learning model comprises a large language model.

Aspect 11: The method of any of aspects 1 through 10, wherein the information associated with the organization comprises information associated with resources of the organization that are managed by the identity management platform, information associated with users of the resources, information associated with security events pertaining to the users, or information associated with security events pertaining to the resources, or any combination thereof.

Aspect 12: A device for managing report requests, comprising one or more memories storing processor-executable code, and one or more processors coupled with the one or more memories and individually or collectively operable to execute the code to cause the device to perform a method of any of aspects 1 through 11.

Aspect 13: A device for managing report requests, comprising at least one means for performing a method of any of aspects 1 through 11.

Aspect 14: A non-transitory computer-readable medium storing code for managing report requests, the code comprising instructions executable by a processor to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing report requests at a device associated with an identity management platform, comprising:
   receiving a natural language message from a user of an organization via a client device, wherein the natural language message indicates a request for information associated with the organization;
   generating, via a machine learning model, a first query based at least in part on translating the natural language message into an intermediary language using the machine learning model, wherein the intermediary language is associated with the identity management platform;
   validating the first query within the intermediary language;
   translating the first query into a second intermediary language associated with a database comprising the information associated with the organization that is requested via the natural language message, wherein translating the first query into the second intermediary language is based at least in part on validating the first query; and
   transmitting a report to the user via the client device, wherein the report comprises the information associated with the organization, and wherein the report comprises the information based at least in part on generating the first query, validating the first query, and translating the first query from the intermediary language into the second intermediary language.

2. The method of claim 1, wherein the intermediary language comprises a first domain-specific language and the second intermediary language comprises a second domain-specific language, the method further comprising:
   generating a second query based at least in part on translating the first query into the second domain-specific language using a compiler, wherein the second domain-specific language is associated with the database comprising the information associated with the organization; and
   generating the report based at least in part on executing the second query.

3. The method of claim 2, wherein validating the first query comprises:
   transmitting the first query to the user of the organization via the client device; and
   receiving a second natural language message from the user of the organization via the client device, wherein the second natural language message comprises an indication of a modification to the first query, and wherein translating the first query into the second domain-specific language comprises:
   translating the modification of the first query into the second domain-specific language.

4. The method of claim 3, wherein the second natural language message indicates the modification to the request for information associated with the organization, or the second natural language message comprises the modification of the first query.

5. The method of claim 2, wherein validating the first query comprises:
   generating an intermediate representation of the first query; and
   validating the intermediate representation based at least in part on a schema pre-defined by the database, wherein translating the first query into the second domain-specific language is based at least in part on the validating.

6. The method of claim 2, further comprising:
determining that the first query satisfies one or more constraints configured by the identity management platform, wherein translating the first query into the second domain-specific language is based at least in part on the determining.

7. The method of claim 6, wherein determining that the first query satisfies the one or more constraints comprises:
determining that the first query only requests information associated with the organization.

8. The method of claim 1, further comprising:
training the machine learning model to translate the natural language message into the intermediary language, wherein translating the natural language message into the first query is based at least in part on the training.

9. The method of claim 8, wherein the information associated with the organization is based at least in part on data obtained by the identity management platform, and wherein training the machine learning model exposes the machine learning model to a structure of data.

10. The method of claim 1, wherein the machine learning model comprises a large language model.

11. The method of claim 1, wherein the information associated with the organization comprises information associated with resources of the organization that are managed by the identity management platform, information associated with users of the resources, information associated with security events pertaining to the users, or information associated with security events pertaining to the resources, or any combination thereof.

12. A device for managing report requests, comprising:
one or more memories storing processor-executable code; and
one or more processors coupled with the one or more memories and individually or collectively operable to execute the code to cause the device to:
receive a natural language message from a user of an organization via a client device, wherein the natural language message indicates a request for information associated with the organization;
generate, via a machine learning model, a first query based at least in part on translating the natural language message into an intermediary language using the machine learning model, wherein the intermediary language is associated with an identity management platform;
validate the first query within the intermediary language;
translate the first query into a second intermediary language associated with a database comprising the information associated with the organization that is requested via the natural language message, wherein translating the first query into the second intermediary language is based at least in part on validating the first query; and
transmit a report to the user via the client device, wherein the report comprises the information associated with the organization, and wherein the report comprises the information based at least in part on generating the first query, validating the first query, and translating the first query from the intermediary language into the second intermediary language.

13. The device of claim 12, wherein the intermediary language comprises a first domain-specific language and the second intermediary language comprises a second domain-specific language, and the one or more processors are individually or collectively further operable to execute the code to cause the device to:
generate a second query based at least in part on translating the first query into the second domain-specific language using a compiler, wherein the second domain-specific language is associated with the database comprising the information associated with the organization; and
generate the report based at least in part on executing the second query.

14. The device of claim 13, wherein, to validate the first query, the one or more processors are individually or collectively operable to execute the code to cause the device to:
transmit the first query to the user of the organization via the client device; and
receive a second natural language message from the user of the organization via the client device, wherein the second natural language message comprises an indication of a modification to the first query, and wherein, to translate the first query into the second domain-specific language, the one or more processors are individually or collectively operable to execute the code to cause the device to:
translate the modification of the first query into the second domain-specific language.

15. The device of claim 14, wherein the second natural language message indicates the modification to the request for information associated with the organization, or the second natural language message comprises the modification of the first query.

16. The device of claim 13, wherein, to validate the first query, the one or more processors are individually or collectively operable to execute the code to cause the device to:
generate an intermediate representation of the first query; and
validate the intermediate representation based at least in part on a schema pre-defined by the database, wherein translating the first query into the second domain-specific language is based at least in part on the validating.

17. The device of claim 13, wherein the one or more processors are individually or collectively further operable to execute the code to cause the device to:
determine that the first query satisfies one or more constraints configured by the identity management platform, wherein translating the first query into the second domain-specific language is based at least in part on the determining.

18. The device of claim 17, wherein, to determine that the first query satisfies the one or more constraints, the one or more processors are individually or collectively operable to execute the code to cause the device to:
determine that the first query only requests information associated with the organization.

19. The device of claim 12, wherein the one or more processors are individually or collectively further operable to execute the code to cause the device to:
train the machine learning model to translate the natural language message into the intermediary language, wherein translating the natural language message into the first query is based at least in part on the training.

20. A non-transitory computer-readable medium storing code for managing report requests, the code comprising instructions executable by one or more processors to:
- receive a natural language message from a user of an organization via a client device, wherein the natural language message indicates a request for information associated with the organization;
- generate, via a machine learning model, a first query based at least in part on translating the natural language message into an intermediary language using the machine learning model, wherein the intermediary language is associated with an identity management platform;
- validate the first query within the intermediary language;
- translate the first query into a second intermediary language associated with a database comprising the information associated with the organization that is requested via the natural language message, wherein translating the first query into the second intermediary language is based at least in part on validating the first query; and
- transmit a report to the user via the client device, wherein the report comprises the information associated with the organization, and wherein the report comprises the information based at least in part on generating the first query, validating the first query, and translating the first query from the intermediary language into the second intermediary language.

* * * * *